United States Patent
Kapraly et al.

(10) Patent No.: US 6,412,209 B1
(45) Date of Patent: Jul. 2, 2002

(54) WATERFOWL DECOY FOR SELECTIVELY SIMULATING FEEDING IN WATER

(76) Inventors: Edward C. Kapraly, 2295 River Rd., Delaware, OH (US) 43015; Richard L. Miller, 12 Parkside Dr., Dix Hills, NY (US) 11746-4879

( * ) Notice: Subject to any disclaimer, the term of this patent is extended or adjusted under 35 U.S.C. 154(b) by 25 days.

(21) Appl. No.: 09/713,287

(22) Filed: Jul. 5, 2000

(51) Int. Cl.$^7$ ............................................. A01M 31/06
(52) U.S. Cl. ............................................................ 43/3
(58) Field of Search .................. 43/2, 3, 26.1; 446/154, 446/156–158

(56) References Cited

U.S. PATENT DOCUMENTS

| | | | |
|---|---|---|---|
| 2,457,295 A | * 12/1948 | Woodhead | |
| 2,591,554 A | * 4/1952 | Kinney et al. | |
| 3,434,234 A | * 3/1969 | Watts et al. | |
| 4,322,908 A | * 4/1982 | McCrory | 43/3 |
| 4,566,214 A | 1/1986 | McCrory et al. | 43/3 |
| 5,377,439 A | * 1/1995 | Roos et al. | 43/3 |
| 5,775,022 A | 7/1998 | Sumrall et al. | 43/3 |
| 5,809,683 A | * 9/1998 | Solomon | 43/3 |
| 5,926,990 A | 7/1999 | Okimoto | 43/2 |
| 5,930,936 A | * 8/1999 | Parr et al. | 43/3 |
| 6,088,944 A | * 7/2000 | Jones | 43/3 |
| 6,212,816 B1 | * 4/2001 | Babbitt et al. | 43/3 |

* cited by examiner

Primary Examiner—Charles T. Jordan
Assistant Examiner—Kimberly S. Smith
(74) Attorney, Agent, or Firm—Richard L. Miller, P.E.

(57) ABSTRACT

A waterfowl decoy for selectively simulating feeding in water. An articulating apparatus includes a motor, a threaded rod, a weight, a motion-reversing toggle switch, and a motion-reversing sliding plate having forward and rearward-stopping tabs. The motion-reversing toggle switch is toggled forwardly when the weight moves forwardly enough to contact and move the forwardmost-stopping tab forwardly, causing the motor to reverse, and when the weight moves rearwardly enough to contact and move the rearwardmost-stopping tab rearwardly, the motion-reversing toggle switch is toggled rearwardly causing the motor to reverse, with such back and forth motion of the weight causing the body to duck in and out of the water and imitate feeding. The articulating apparatus further includes a normally closed-movement termination switch that is selectively engaged by the rearwardmost-stopping tab, and when engaged, opens and prevents power from communicating with the motor, terminating motion of the weight so as to cease the body from ducking in and out of the water, while assuring that the body is in a non-feeding position, and a normally-opened momentarily-closed electrical switching device that when closed momentarily shorts out the normally closed-movement termination switch so as to allow the body to continue ducking in and out of the water, if desired. The electrical switching device can be either a remote control switch, a timer switch, or a random generator switch.

20 Claims, 2 Drawing Sheets

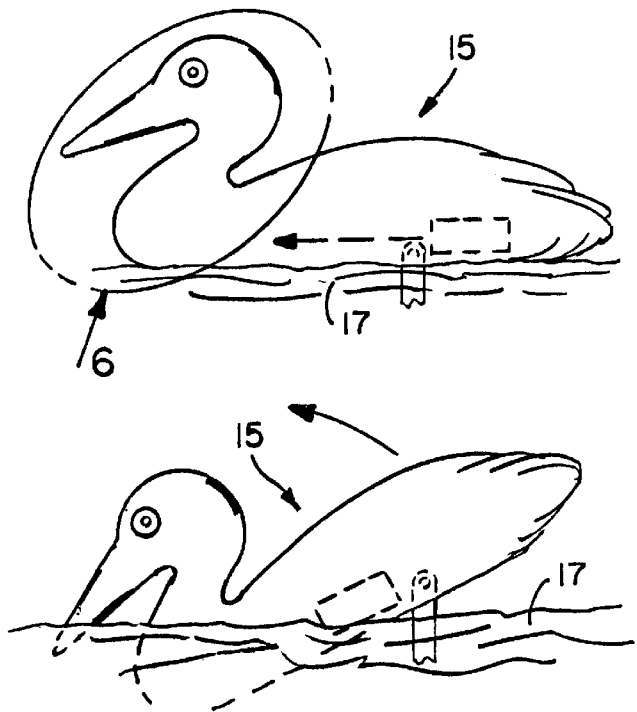
FIG. 1
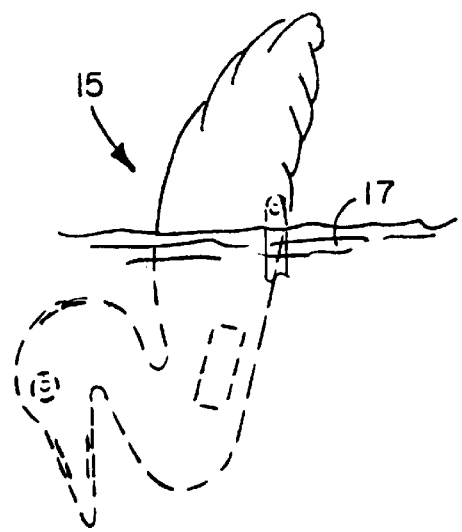
FIG. 3
FIG. 2
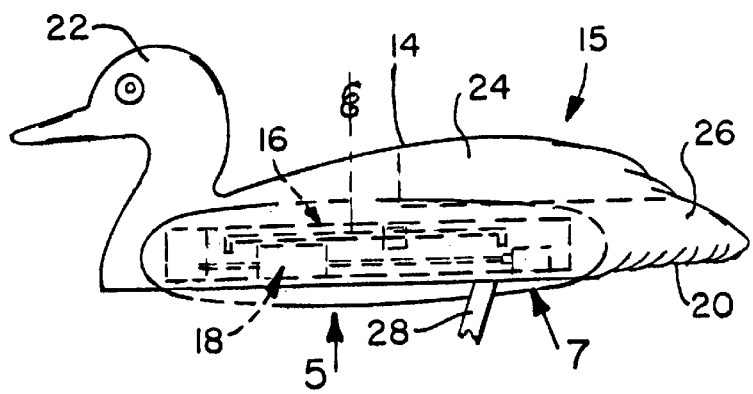
FIG. 4
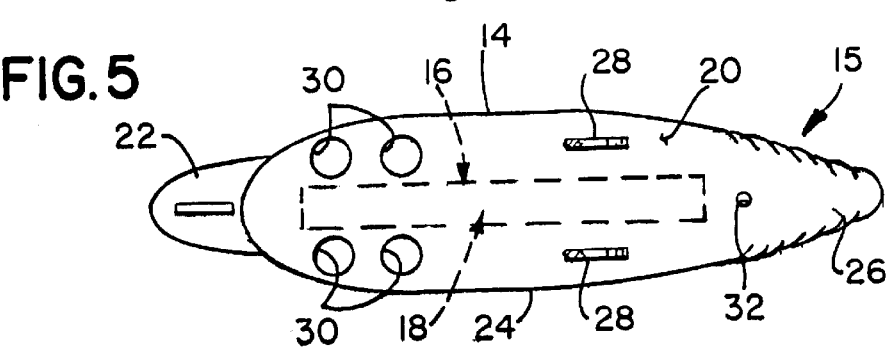
FIG. 5

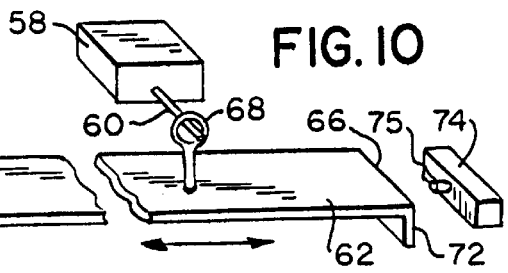
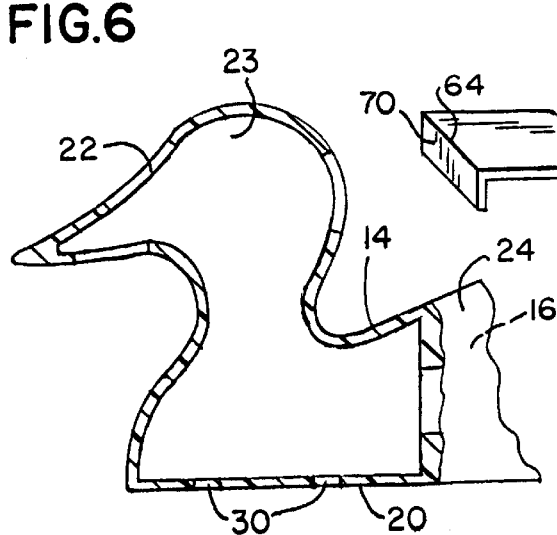
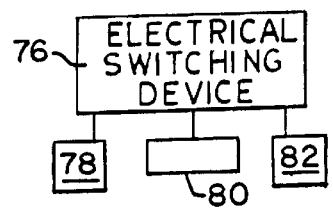
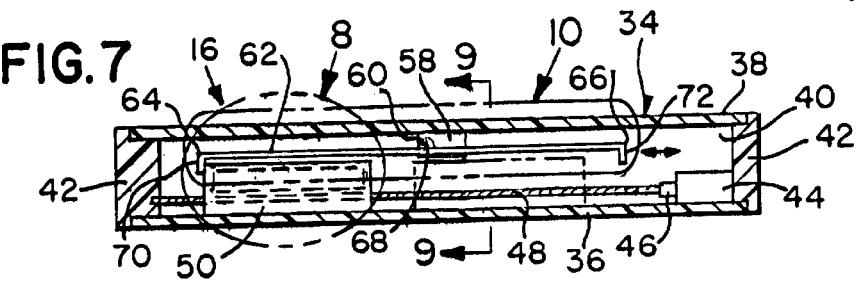
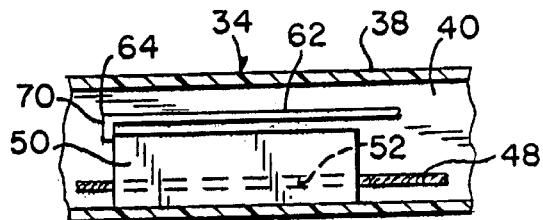
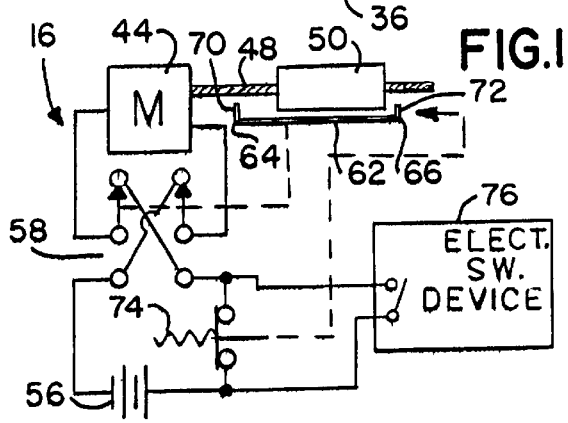
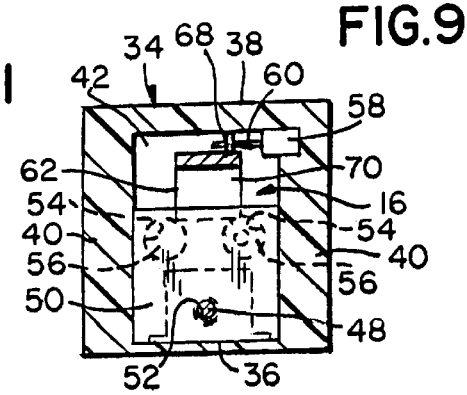

WATERFOWL DECOY FOR SELECTIVELY SIMULATING FEEDING IN WATER

BACKGROUND OF THE INVENTION

1. Field of the Invention

The resent invention relates to a waterfowl decoy. More particularly, the present invention relates to a waterfowl decoy for selectively simulating feeding in water.

2. Description of the Prior Art

Numerous innovations for waterfowl decoys have been provided in the prior art that will be described. Even though these innovations may be suitable for the specific individual purposes to which they address, however, they differ from the present invention.

A FIRST EXAMPLE, U.S. Pat. No. 4,322,908 to McCrory teaches an improved animated wildfowl decoy with self-contained power and control systems featuring selectable solar energy power or alternative battery power, continuous solar energy re-charge of battery, unique new highly efficient capstan type torque conversion system, positive movement back and forth across the water, automatic direction reversal, sporadic movements, and unaffected by wind, currents or shallow water.

A SECOND EXAMPLE, U.S. Pat. No. 4,566,214 to McCrory et al. teaches an improved wildfowl decoy featuring electromechanical means for lifelike motion when operated upon water. Anchored the same as regular wildfowl decoy it, while operating, moves continuously and produces a continuous outflow of ripples upon the water surrounding it. It is uncomplicated, durable long running, and cost is low.

A THIRD EXAMPLE, U.S. Pat. No. 5,775,022 to Sumrall et al. teaches a self-propelled floating decoy for simulating the swimming characteristics of waterfowl. Propulsion in the water is produced by a sculling tail fin which also causes a side to side rocking motion that simulates the back and head movement of a live duck paddling its feet. The decoy includes a flat base with a shallow draft. The flat bottom of the base is the lowest point in the water with no obstructions that would become entangled in congested water. An opening in the rear end extends through the base so that an electric motor driven propulsion system moves a tail fin coupled to said propulsion system through the opening. A decoy shell representative of a water fowl is attached to the base. The tail fin moves from side to side providing a motion to the decoy approximating the motion of a swimming water fowl.

A FOURTH EXAMPLE, U.S. Pat. No. 5,926,990 to Okimoto teaches a bird decoy movement system for simulating the movement of a bird. Some bird decoys are manufactured with legs that pivot at the lower part of the body. These decoys also have a prefabricated opening on the bottom of the body behind the pivotal legs. The preferred embodiment of the present invention takes advantage of the existing design in that the motion device is mounted in the prefabricated opening. The rotary motion of an arm mounted on the motion device shaft imparts a linear motion to a rod mounted on the end of the arm. When the other end of the arm is attached to a fixed rod in a ground plane, the decoy pivots about the pivotal legs and simulated feeding. Other embodiments simulate movement of a shell type decoy and a full body decoy with fixed legs.

A FIFTH EXAMPLE, U.S. Pat. No. 5,930,936 to Parr et al. teaches a decoy, for simulating a wildfowl in feeding position, that has a body within a keel located beneath the body. The body houses a motor and motor controller, for intermittently rotating an axle with outer ends, located outside the body, having paddle members thereon. Rotation of the axle, and thus the paddle members, causes the water in which the decoy is deployed to splash. The motor controller permits operator selectable durations of energization time and idle time for rotation of the paddle members. A sliding weight in the keel permits adjustment of pitch of the decoy. A counterweight permits balance adjustment, thereby permitting operation of the decoy to include a roll, or rotation about a vertical axis. The decoy also has a unique fitting for attachment of an anchor.

It is apparent that numerous innovations for waterfowl decoys have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a waterfowl decoy for selectively simulating feeding in water that avoids the disadvantages of the prior art.

ANOTHER OBJECT of the present invention is to provide a waterfowl decoy for selectively simulating feeding in water that is simple and inexpensive to manufacture.

STILL ANOTHER OBJECT of the present invention is to provide a waterfowl decoy for selectively simulating feeding in water that is simple to use.

BRIEFLY STATED, YET ANOTHER OBJECT of the present invention is to provide a waterfowl decoy for selectively simulating feeding in water. An articulating apparatus includes a motor, a threaded rod, a weight, a motion-reversing toggle switch, and a motion-reversing sliding plate having forward and rearward-stopping tabs. The motion-reversing toggle switch is toggled forwardly when the weight moves forwardly enough to contact and move the forwardmost-stopping tab forwardly, causing the motor to reverse, and when the weight moves rearwardly enough to contact and move the rearwardmost-stopping tab rearwardly, the motion-reversing toggle switch is toggled rearwardly causing the motor to reverse, with such back and forth motion of the weight causing the body to duck in and out of the water and imitate feeding. The articulating apparatus further includes a normally closed-movement termination switch that is selectively engaged by the rearwardmost-stopping tab, and when engaged, opens and prevents power from communicating with the motor, terminating motion of the weight so as to cease the body from ducking in and out of the water, while assuring that the body is in a non-feeding position, and a normally-opened momentarily-closed electrical switching device that when closed momentarily shorts out the normally closed-movement termination switch so as to allow the body to continue ducking in and out of the water, if desired. The electrical switching device can be either a remote control switch, a timer switch, or a random generator switch.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic side elevational view of the present invention prior to imitating feeding in water; FIG. 2 is a diagrammatic side elevational view of the present invention beginning to imitate feeding in water;

FIG. 3 is a diagrammatic side elevational view of the present invention imitating feeding in water;

FIG. 4 is a diagrammatic side elevational view of the present invention shown in FIGS. 1–3;

FIG. 5 is a diagrammatic bottom plan view taken generally in the direction of arrow 5 in FIG. 4;

FIG. 6 is an enlarged diagrammatic cross sectional view of the area generally enclosed by the dotted curve identified by arrow 6 in FIG. 1 of the head of the present invention;

FIG. 7 is an enlarged diagrammatic cross sectional view of the area generally enclosed by the dotted curve identified by arrow in FIG. 4 of the feeding simulation apparatus of the present invention;

FIG. 8 is an enlarged diagrammatic cross sectional view of the area generally enclosed by the dotted curve identified by arrow 8 in FIG. 7 of the weight of the feeding simulation apparatus of the present invention;

FIG. 9 is an enlarged diagrammatic cross sectional view taken on line 9—9 in FIG. 7 of the feeding simulation apparatus of the present invention;

FIG. 10 is an enlarged diagrammatic perspective view of the area generally enclosed by the dotted curve identified by arrow 10 in FIG. 7 of the toggling apparatus of the feeding simulation apparatus of the present invention;

FIG. 11 is a schematic diagram of the feeding apparatus of the present invention; and FIG. 12 is a block diagram of the possibilities for the electrical switch device of the present invention.

LIST OF REFERENCE NUMERALS UTILIZED IN THE DRAWING 14 body
15 waterfowl decoy of present invention for selectively simulating feeding in water 17
16 body articulating apparatus-containing chamber contained in body 14
17 water
18 body-articulating apparatus
20 water-engaging lower terminal surface of body 14
22 head of body 14
23 water-containing chamber contained in head 22 of body 14
24 torso of body 14
26 tail of body 14
28 pair of legs of body 14
30 plurality of water-passage bores in water-engaging lower terminal surface 20 of body 14 for allowing passage of water 17 therethrough, and into water-containing chamber 23 in head 22, when waterfowl decoy 15 is simulating feeding in water 17
32 vent bore in water-engaging lower terminal surface 20 of body 14 for allowing passage of air therethrough, when water-containing chamber 23 in head 22 is filling with water 17
34 housing of articulating apparatus 16
36 floor of housing 34 of articulating apparatus 16
38 ceiling of housing 34 of articulating apparatus 16
40 pair of side walls of housing 34 of articulating apparatus 16
42 pair of end walls of housing 34 of articulating apparatus 16
44 motor of articulating apparatus 16
46 output shaft of motor 44 of articulating apparatus 16
48 threaded rod of articulating apparatus 16
50 weight of articulating apparatus 16
52 threaded throughbore through weight 50 of articulating apparatus 16
54 power interface contained in weight 50 of articulating apparatus 16 for holding batteries 56 to power motor 44 of articulating apparatus 16 and for reducing required weight of weight 50 of articulating apparatus 16
56 batteries for powering motor 44 of articulating apparatus 16 and for reducing required weight of weight 50 of articulating apparatus 16
58 motion-reversing toggle switch of articulating apparatus 16
60 operating handle of motion-reversing toggle switch 58 of articulating apparatus 16
62 motion-reversing sliding plate of articulating apparatus 16
64 forwardmost terminal edge of motion-reversing sliding plate 62 of articulating apparatus 16
66 rearwardmost terminal edge of motion-reversing sliding plate 62 of articulating apparatus 16
68 eye of motion-reversing sliding plate 62
70 forward-stopping tab of motion-reversing sliding plate 62 of articulating apparatus 16
72 rearward-stopping tab of motion-reversing sliding plate 62 of articulating apparatus 16
74 normally closed-movement termination switch of articulating apparatus 16
75 operating button of normally closed-movement termination switch 74 of articulating apparatus 16
76 normally-opened momentarily-closed electrical switching device of articulating apparatus 16
78 remote control switch of normally-opened momentarily-closed electrical switching device 76 for allowing user remote from body 14 to determine feeding pattern
80 timer switch of normally-opened momentarily-closed electrical switching device 76
82 random generator switch of normally-opened momentarily-closed electrical switching device 76.

DETAILED DESCRIPTION OF THE PREFERRED EMBODIMENT

Referring now to the figures, in which like numerals indicate like parts, and particularly to FIGS. 1–3, the waterfowl decoy of the present invention is shown generally at 15 for selectively simulating feeding in water 17.

The overall configuration of the waterfowl decoy 15 can best be seen in FIGS. 4 and 5, and as such, will be discussed with reference thereto.

The waterfowl decoy 15 comprises a body 14 that contains a body articulating apparatus-containing chamber 16 therein.

The waterfowl decoy 15 further comprises body-articulating apparatus 18 that is disposed in the body articulating apparatus-containing chamber 16 contained in the body 14.

The specific configuration of the body 14 can best be seen in FIGS. 4–6, and as such, will be discussed with reference thereto.

The body 14 is waterfowl-shaped, and has a water-engaging lower terminal surface 20, a head 22 that contains a water-containing chamber 23, a torso 24 that contains the body articulating apparatus-containing chamber 16, a tail 26, and a pair of legs 28 that are freely pivotally mounted to the torso 24 of the body 14, approximately midway between the head 22 thereof and the tail 26 thereof, and which are heavier than the water 17 so as to remain always vertical, regardless of position of the torso 24 thereof.

The water-engaging lower terminal surface 20 of the body 14 has a plurality of water-passage bores 30 therethrough that are disposed directly below, and fluidly communicate with, the water-containing chamber 23 in the head 22 for allowing passage of the water 17 therethrough, and into the water-containing chamber 23 in the head 22, when the waterfowl decoy 15 is simulating feeding in the water 17.

The water-engaging lower terminal surface 20 of the body 14 further has a vent bore 32 therethrough that fluidly communicates with the water-containing chamber 23 in the head 22 for allowing passage of air therethrough, when the water-containing chamber 23 in the head 22 is filling with the water 17.

The vent bore 32 in the water-engaging lower terminal surface 20 is disposed at the tail 26 of the body 14 for being immediately exposed to the air when the waterfowl decoy 15 is beginning to simulate feeding in the water 17.

The specific configuration of the articulating apparatus 16 can best be seen in FIGS. 7–12, and as such, will be discussed with reference thereto.

The articulating apparatus 16 comprises a housing 34 that is hollow and fills the body articulating apparatus-containing chamber 16 that extends axially in the torso 24.

The housing 34 of the articulating apparatus 16 is generally rectangular-parallelepiped-shaped, and has a floor 36, a ceiling 38, a pair of side walls 40, and a pair of end walls 42.

The articulating apparatus 16 further comprises a motor 44 that sits on the floor 36 of the housing 34, abuts a rearmost end wall 42 of the housing 34, and has an output shaft 46 that extends axially into the housing 34.

The articulating apparatus 16 further comprises a threaded rod 48 that extends coaxially from, and rotates with, the output shaft 46 of the motor 44, to rotatably into a frontmost end wall 42 of the housing 34.

The articulating apparatus 16 further comprises a weight 50 that slidably engages, and is captured by, the floor 36 of the housing 34 and the pair of side walls 40 of the housing 34 for axial movement relative thereto, and no rotational movement relative thereto.

The weight 50 of the articulating apparatus 16 has a threaded throughbore 52 that extends axially therethrough, and which threadably receives the threaded rod 48 of the articulating apparatus 16.

The weight 50 of the articulating apparatus 16 moves along the threaded rod 48 of the articulating apparatus 16 when the motor 44 of the articulating apparatus 16 is activated, by virtue of the motor 44 of the articulating apparatus 16 causing the output shaft 46 of the motor 44 to rotate which causes the threaded rod 48 of the articulating apparatus 16 to rotate and thread the weight 50 of the articulating apparatus 16 therealong, thereby converting rotatory motion into rectilinear motion.

The weight 50 of the articulating apparatus 16 contains a power interface 54 which is in electrical communication with the motor 44 of the articulating apparatus 16 for holding batteries 56 to power the motor 44 of the articulating apparatus 16 and for reducing required weight of the weight 50 of the articulating apparatus 16.

The articulating apparatus 16 further comprises a motion-reversing toggle switch 58 that depends laterally from the ceiling 38 of the housing 34, contacts one side wall 40 of the housing 34, is disposed approximately midway between the pair of end walls 42 of the housing 34, has an operating handle 60 that extends laterally towards the other side wall 40 of the housing 34, and is in electrical communication with the motor 44 of the articulating apparatus 16.

The articulating apparatus 16 further comprises a motion-reversing sliding plate 62 that is operatively connected to the operating handle 60 of the motion-reversing toggle switch 58, is disposed parallelely between, and moves axially between, the ceiling 38 of the housing 34 and the weight 50 of the articulating apparatus 16, and has a forwardmost terminal edge 64 and a rearwardmost terminal edge 66.

The motion-reversing sliding plate 62 of the articulating apparatus 16 further has an eye 68 that extend upwardly therefrom, is disposed approximately midway between the forwardmost end 64 thereof and the rearwardmost end 66 thereof, and operatively receives the operating handle 60 of the motion-reversing toggle switch 58.

The motion-reversing sliding plate 62 of the articulating apparatus 16 further has a forward-stopping tab 70 that depends from the forwardmost terminal edge 64 thereof, and a rearward-stopping tab 72 that depends from the rearwardmost terminal edge 66 thereof, and which individually selectively engage the weight 50 of the articulating apparatus 16.

The operating handle 60 of the motion-reversing toggle switch 58 is toggled forwardly when the weight 50 of the articulating apparatus 16 moves forwardly enough to contact and move the forwardmost-stopping tab 70 of the motion-reversing sliding plate 62 forwardly, causing the motor 44 of the articulating apparatus 16 to reverse, and when the weight 50 of the articulating apparatus 16 moves rearwardly enough to contact and move the rearwardmost-stopping tab 72 of the motion-reversing sliding plate 62 rearwardly, the operating handle 60 of the motion-reversing toggle switch 58 is toggled rearwardly causing the motor 44 of the articulating apparatus 16 to reverse, with such back and forth motion of the weight 50 of the articulating apparatus 16 causing the head 22 of the body 14 to duck in and out of the water 17 and imitate feeding in the water 17.

The articulating apparatus 16 further comprises a normally closed-movement termination switch 74 that has an operating button 75 which is selectively engaged by the rearwardmost-stopping tab 72 of the motion-reversing sliding plate 62, and when engaged, opens and prevents power from communicating with the motor 44 of the articulating apparatus 16 and terminates motion of the weight 50 of the articulating apparatus 16 so as to cease the head 22 of the body 14 from ducking in and out of the water 17, while assuring that the body 14 is in a non-feeding position.

The articulating apparatus 16 further comprises a normally-opened momentarily-closed electrical switching device 76 that is in electrical communication with, and when momentarily closed shorts out, the normally closed-movement termination switch 74 of the articulating apparatus 16 so as to allow the head 22 of the body 14 to continue ducking in and out of the water 17, if desired, even though the rearwardmost-stopping tab 72 of the motion-reversing sliding plate 62 has engaged the normally closed-movement termination switch 74.

The normally-opened momentarily-closed electrical switching device 76 of the articulating apparatus 16 is a remote control switch 78 for allowing a user remote from the body 14 to determine feeding pattern.

The normally-opened momentarily-closed electrical switching device 76 of the articulating apparatus 16 is a timer switch 80 that predetermines a desired feeding pattern as a function of time.

The normally-opened momentarily-closed electrical switching device 76 of the articulating apparatus 16 is a random generator switch 82 that predetermines feeding pattern randomly.

It will be understood that each of the elements described above, or two or more together, may also find a useful application in other types of constructions differing from the types described above.

While the invention has been illustrated and described as embodied in a waterfowl decoy for selectively simulating feeding in water, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A waterfowl decoy for selectively simulating feeding in water, comprising:
   a) a body containing a body-articulating apparatus-containing chamber therein; and
   b) a body-articulating apparatus disposed in said body-articulating apparatus-containing chamber contained in said body, wherein said body is waterfowl-shaped, and has:
      A) a water-engaging lower terminal surface;
      B) a head that contains a water-containing chamber;
      C) a torso that contains said body-articulating apparatus-containing chamber;
      D) a tail; and
      E) a pair of legs that are freely pivotally mounted to said torso of said body, approximately midway between said head thereof and said tail thereof, and which are heavier than the water so as to remain always vertical, regardless of position of said torso thereof, wherein said water-engaging lower terminal surface of said body has a plurality of water-passage bores therethrough that are disposed directly below, and fluidly communicate with, said water-containing chamber in said head for allowing passage of the water therethrough, and into said water-containing chamber in said head, when said waterfowl decoy is simulating feeding in the water, wherein said water-engaging lower terminal surface of said body has a vent bore therethrough that fluidly communicates with said water-containing chamber in said head for allowing passage of air therethrough, when said water-containing chamber in said head is filling with the water.

2. The decoy as defined in claim 1, wherein said vent bore in said water-engaging lower terminal surface is disposed at said tail of said body for being immediately exposed to the air when said waterfowl decoy is beginning to simulate feeding in the water.

3. The decoy as defined in claim 1, wherein said body-articulating apparatus comprises a housing that is hollow and fills said body-articulating apparatus-containing chamber that extends axially in said torso.

4. The decoy as defined in claim 3, wherein said housing of said body-articulating apparatus is generally rectangular-parallelepiped-shaped, and has:
   a) a floor;
   b) a ceiling;
   c) a pair of side walls; and
   d) a pair of end walls.

5. The decoy as defined in claim 4, wherein said body-articulating apparatus further comprises a motor that sits on said floor of said housing, abuts a rearmost end wall of said housing, and has an output shaft that extends axially into said housing.

6. The decoy as defined in claim 5, wherein said body-articulating apparatus further comprises a threaded rod that extends coaxially from, said output shaft of said motor, to a frontmost end wall of said housing, and rotates with, said output shaft of said motor.

7. The decoy as defined in claim 6, wherein said body-articulating apparatus further comprises a weight that slidably engages, and is captured by, said floor of said housing and said pair of side walls of said housing for axial movement relative thereto, and no rotational movement relative thereto.

8. The decoy as defined in claim 7, wherein said weight of said body-articulating apparatus has a threaded throughbore that extends axially therethrough, and which threadably receives said threaded rod of said body-articulating apparatus.

9. The decoy as defined in claim 7, wherein said weight of said body-articulating apparatus moves along said threaded rod of said body-articulating apparatus when said motor of said body-articulating apparatus is activated, by virtue of said motor of said body-articulating apparatus causing said output shaft of said motor to rotate which causes said threaded rod of said body-articulating apparatus to rotate and thread said weight of said body-articulating apparatus therealong, thereby converting rotatory motion into rectilinear motion.

10. The decoy as defined in claim 7, wherein said weight of said body-articulating apparatus contains a power interface which is in electrical communication with said motor of said body-articulating apparatus for holding batteries to power said motor of said body-articulating apparatus and for reducing required weight of said weight of said body-articulating apparatus.

11. The decoy as defined in claim 7, wherein said body-articulating apparatus further comprises a motion-reversing toggle switch that depends laterally from said ceiling of said housing, contacts one side wall of said housing, is disposed approximately midway between said pair of end walls of said housing, has an operating handle that extends laterally towards the other side wall of said housing, and is in electrical communication with said motor of said body-articulating apparatus.

12. The decoy as defined in claim 11, wherein said body-articulating apparatus further comprises a motion-reversing sliding plate that is operatively connected to said operating handle of said motion-reversing toggle switch, is disposed parallelely between, and moves axially between, said ceiling of said housing and said weight of said body-articulating apparatus, and has:
   a) a forwardmost terminal edge; and
   b) a rearwardmost terminal edge.

13. The decoy as defined in claim 12, wherein said motion-reversing sliding plate of said body-articulating apparatus further has an eye that extend upwardly therefrom, is disposed approximately midway between said forwardmost end thereof and said rearwardmost end thereof, and operatively receives said operating handle of said motion-reversing toggle switch.

14. The decoy as defined in claim 12, wherein said motion-reversing sliding plate of said body-articulating apparatus further has:

a) a forward-stopping tab that depends from said forwardmost terminal edge thereof; and b) a rearward-stopping tab that depends from said rearwardmost terminal edge thereof;

said forward-stopping tab thereof and said rearward-stopping tab thereof individually selectively engage said weight of said body-articulating apparatus.

15. The decoy as defined in claim 14, wherein said operating handle of said motion-reversing toggle switch is toggled forwardly when said weight of said body-articulating apparatus moves forwardly enough to contact and move said forwardmost-stopping tab of said motion-reversing sliding plate forwardly, causing said motor of said body-articulating apparatus to reverse, and when said weight of said body-articulating apparatus moves rearwardly enough to contact and move said rearwardmost-stopping tab of said motion-reversing sliding plate rearwardly, said operating handle of said motion-reversing toggle switch is toggled rearwardly causing said motor of said body-articulating apparatus to reverse, with such back and forth motion of said weight of said body-articulating apparatus causing said head of said body to duck in and out of the water and imitate feeding in the water.

16. The decoy as defined in claim 14, wherein said body-articulating apparatus further comprises a normally closed-movement termination switch that has an operating button which is selectively engaged by said rearwardmost-stopping tab of said motion-reversing sliding plate, and when engaged, opens and prevents power from communicating with said motor of said body-articulating apparatus, terminating motion of said weight of said body-articulating apparatus so as to cease said head of said body from ducking in and out of the water, while assuring that said body is in a non-feeding position.

17. The decoy as defined in claim 16, wherein said body-articulating apparatus further comprises a normally-opened momentarily-closed electrical switching device that is in electrical communication with, and when closed momentarily shorts out, said normally closed-movement termination switch of said body-articulating apparatus so as to allow said head of said body to continue ducking in and out of the water, if desired, even though said rearwardmost-stopping tab of said motion-reversing sliding plate has engaged said normally closed-movement termination switch.

18. The decoy as defined in claim 17, wherein said normally-opened momentarily-closed electrical switching device of said body-articulating apparatus is a remote control switch for allowing a user remote from said body to determine feeding pattern.

19. The decoy as defined in claim 17, wherein said normally-opened momentarily-closed electrical switching device of said body-articulating apparatus is a timer switch that predetermines a desired feeding pattern as a function of time.

20. The decoy as defined in claim 17, wherein said normally-opened momentarily-closed electrical switching device of said body-articulating apparatus is a random generator switch that predetermines feeding pattern randomly.

\* \* \* \* \*